US012545552B2

(12) United States Patent
Li et al.

(10) Patent No.: US 12,545,552 B2
(45) Date of Patent: Feb. 10, 2026

(54) SELF-CHECKING DEVICE AND METHOD FOR ELEVATOR BRAKING DEVICE AND ELEVATOR SYSTEM

(71) Applicant: Otis Elevator Company, Farmington, CT (US)

(72) Inventors: Guosong Li, Tianjin (CN); Hua Zhou, Tianjin (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 1227 days.

(21) Appl. No.: 17/392,840

(22) Filed: Aug. 3, 2021

(65) Prior Publication Data

US 2022/0194740 A1 Jun. 23, 2022

(30) Foreign Application Priority Data

Dec. 17, 2020 (CN) ........................ 202011493843.1

(51) Int. Cl.
*B66B 5/00* (2006.01)
*B66B 1/32* (2006.01)

(52) U.S. Cl.
CPC .............. *B66B 5/0031* (2013.01); *B66B 1/32* (2013.01)

(58) Field of Classification Search
CPC .. B60T 2270/40; B60T 2270/403; G01L 5/28; B66B 5/0031; B66B 1/32; B66B 5/0087; B66B 5/0037; B66B 5/0025
See application file for complete search history.

(56) References Cited

U.S. PATENT DOCUMENTS

| | | | | |
|---|---|---|---|---|
| 2003/0061872 A1* | 4/2003 | Giessler | .................... | G01L 5/28 73/121 |
| 2022/0081253 A1* | 3/2022 | Lindegger | ................. | B66B 1/32 |

FOREIGN PATENT DOCUMENTS

| | | | | |
|---|---|---|---|---|
| CN | 103166540 B * | 9/2015 | | |
| EP | 1462673 A1 * | 9/2004 | ............. | F16D 66/02 |
| JP | 2005001823 A * | 1/2005 | | |

* cited by examiner

*Primary Examiner* — Bickey Dhakal
(74) *Attorney, Agent, or Firm* — CANTOR COLBURN LLP

(57) ABSTRACT

A self-checking device and a self-checking method for an elevator brake device, as well as an elevator system. The self-checking device includes: a controller, which controls a voltage applied to an electromagnetic coil of the elevator brake device, and which is configured to: enable an elevator to enter a test mode; gradually increase the voltage applied to the electromagnetic coil of the brake device in a predetermined pattern when the brake device is in a braking state, or gradually decrease the voltage applied to the electromagnetic coil of the brake device in a predetermined pattern when the brake device is in a non-braking state; and a processor, which is configured to receive and record a first time $t_1$ when a brake switch of the brake device is triggered, and determine whether the brake switch is in a proper position based on the first time $t_1$.

16 Claims, 5 Drawing Sheets

SELF-CHECKING DEVICE AND METHOD FOR ELEVATOR BRAKING DEVICE AND ELEVATOR SYSTEM

FOREIGN PRIORITY

This application claims priority to Chinese Patent Application No. 202011493843.1, filed Dec. 17, 2020, and all the benefits accruing therefrom under 35 U.S.C. § 119, the contents of which in its entirety are herein incorporated by reference.

TECHNICAL FIELD

The present disclosure relates to the field of elevators, and more specifically, the present disclosure relates to a self-checking device and a self-checking method for an elevator brake device.

BACKGROUND

In order to ensure the safety of an elevator, standards stipulate that a brake device of an elevator system needs to be equipped with a brake switch to detect a position state of a movable plate of the brake device. When the position of the movable plate moves from a braking position to a non-braking position or vice versa, the movable plate will press or release the brake switch, thereby feedbacking whether the movable plate is in the braking position through the switching of the brake switch. Since the brake switch is installed on a stationary plate, the position thereof may change after being repeatedly contacted by the movable plate. When the position thereof changes to a certain extent, the state of the movable plate cannot be accurately detected. At this point, the elevator system cannot operate normally due to safety considerations when the position state of the movable plate cannot be known.

Of all the emergency repair reports of the brake device, a very large proportion is related to the position of the brake switch. Maintaining the brake switch in the proper position is very important for the normal operation of the elevator system.

SUMMARY

An object of the present disclosure is to solve or at least alleviate the problems existing in the prior art;

In an aspect, a self-checking device for an elevator brake device is provided, which includes: a controller, which controls a voltage applied to an electromagnetic coil of the elevator brake device, and which is configured to: enable an elevator to enter a test mode; gradually increase the voltage applied to the electromagnetic coil of the brake device in a predetermined pattern when the brake device is in a braking state, or gradually decrease the voltage applied to the electromagnetic coil of the brake device in a predetermined pattern when the brake device is in a non-braking state; and a processor, which is configured to receive and record a first time $t_1$ when a brake switch of the brake device is triggered, and determine whether the brake switch is in a proper position based on the first time $t_1$.

Optionally, in an embodiment of the self-checking device, the processor is further configured to: monitor a current of the electromagnetic coil; record the fluctuation of the current of the electromagnetic coil, and record a second time $t_2$ at the beginning of the fluctuation of the current and a third time $t_3$ at the trough of the fluctuation of the current; and determine whether the brake switch is in the proper position based on a relative relationship among the first time $t_1$, the second time $t_2$ and the third time $t_3$, or determine whether the brake switch is in the proper position based on a relative relationship among a current $I_1$ at the first time $t_1$, a current $I_2$ at the second time $t_2$ and a current $I_3$ at the third time $t_3$.

Optionally, in an embodiment of the self-checking device, the processor is configured to determine that the brake switch is in the proper position when $(t_1-t_2)$ is in a range of $a_1(t_3-t_2)$ to $a_2(t_3-t_2)$, and that the brake switch is in an improper position when $(t_1-t_2)$ is outside the range of $a_1(t_3-t_2)$ to $a_2(t_3-t_2)$, and wherein $a_1$ is selected from 0.2-0.5 and $a_2$ is selected from 0.5-0.8.

Optionally, in an embodiment of the self-checking device, the processor is further configured to: determine a reference trigger time $t_0$ of the brake switch based on a correct installation position of the brake switch during commissioning; and determine whether the brake switch is in the proper position based on the difference between the first time $t_1$ and the reference trigger time $t_0$.

Optionally, in an embodiment of the self-checking device, the controller is configured to increase or decrease the voltage at a first rate in a first section before the fluctuation position, to increase or decrease the voltage at a second rate in a second section including the fluctuation position, and to increase or decrease the voltage at a third rate in a third section after the fluctuation position, wherein the second rate is lower than the first rate and the third rate.

Optionally, in an embodiment of the self-checking device, the controller is configured to apply the voltage gradually increasing from 0% to 100% or gradually decreasing from 100% to 0% in a way of pulse width modulated duty cycle.

Optionally, in an embodiment of the self-checking device, the controller is configured to repeat the self-checking at a specific time interval.

Optionally, in an embodiment of the self-checking device, the processor is configured to send a notification when the brake switch is not properly installed.

In another aspect, an elevator system is provided, which includes the self-checking device according to various embodiments.

In another aspect, a self-checking method for an elevator brake device is provided, the method including: enabling an elevator to enter a test mode; gradually increasing a voltage applied to an electromagnetic coil of the brake device in a predetermined pattern when the brake device is in a braking state, or gradually decreasing the voltage applied to the electromagnetic coil of the brake device in a predetermined pattern when the brake device is in a non-braking state; recording a first time $t_1$ when a brake switch of the brake device is triggered; and determining whether the brake switch is in a proper position based on the first time $t_1$.

Optionally, the method further includes: monitoring a current of the electromagnetic coil; recording the fluctuation of the current of the electromagnetic coil, and recording a second time $t_2$ at the beginning of the fluctuation of the current and a third time $t_3$ at the trough of the fluctuation of the current; and determining whether the brake switch is in the proper position based on a relative relationship among the first time $t_1$, the second time $t_2$ and the third time $t_3$, or determining whether the brake switch is in the proper position based on a relative relationship among a current $I_1$ at the first time $t_1$, a current $I_2$ at the second time $t_2$ and a current $I_3$ at the third time $t_3$.

Optionally, the method further includes: determining that the brake switch is in the proper position when $(t_1-t_2)$ is in a range of $a_1(t_3-t_2)$ to $a_2(t_3-t_2)$, and that the brake switch is in an improper position when $(t_1-t_2)$ is outside the range of $a_1(t_3-t_2)$ to $a_2(t_3-t_2)$, wherein $a_1$ is selected from 0.2-0.5 and $a_2$ is selected from 0.5-0.8.

Optionally, the method further includes: determining a reference trigger time $t_0$ of the brake switch based on a correct installation position of the brake switch during commissioning; and determining whether the brake switch is in the proper position based on the difference between the first time $t_1$ and the reference trigger time $t_0$.

Optionally, the method further includes: increasing or decreasing the voltage at a first rate in a first section before the fluctuation position, increasing or decreasing at a second rate in a second section including the fluctuation position, and increasing or decreasing at a third rate in a third section after the fluctuation position, wherein the second rate is lower than the first rate and the third rate.

Optionally, the method further includes: applying the voltage gradually increasing from 0% to 100% or gradually decreasing from 100% to 0% in a way of pulse width modulated duty cycle.

Optionally, the method further includes: repeating the self-checking method at a specific time interval.

Optionally, the method further includes: sending a notification when the brake switch is not properly installed.

In another aspect, a computer program is provided, which performs the method according to the various embodiments when being executed.

In another aspect, a computer-readable medium is provided, in which a computer program is stored, wherein when the computer program is executed, it performs the method according to the various embodiments.

The device and method according to the embodiments of the present disclosure can monitor the position of the brake switch.

BRIEF DESCRIPTION OF THE DRAWINGS

With reference to the accompanying drawings, the content of the present disclosure will become easier to understand. It can be easily understood by those skilled in the art that these drawings are only for illustrative purpose, and are not intended to limit the scope of protection of the present disclosure. In addition, similar numbers in the drawings are used to denote similar components, in which.

DETAILED DESCRIPTION

Figure 1:
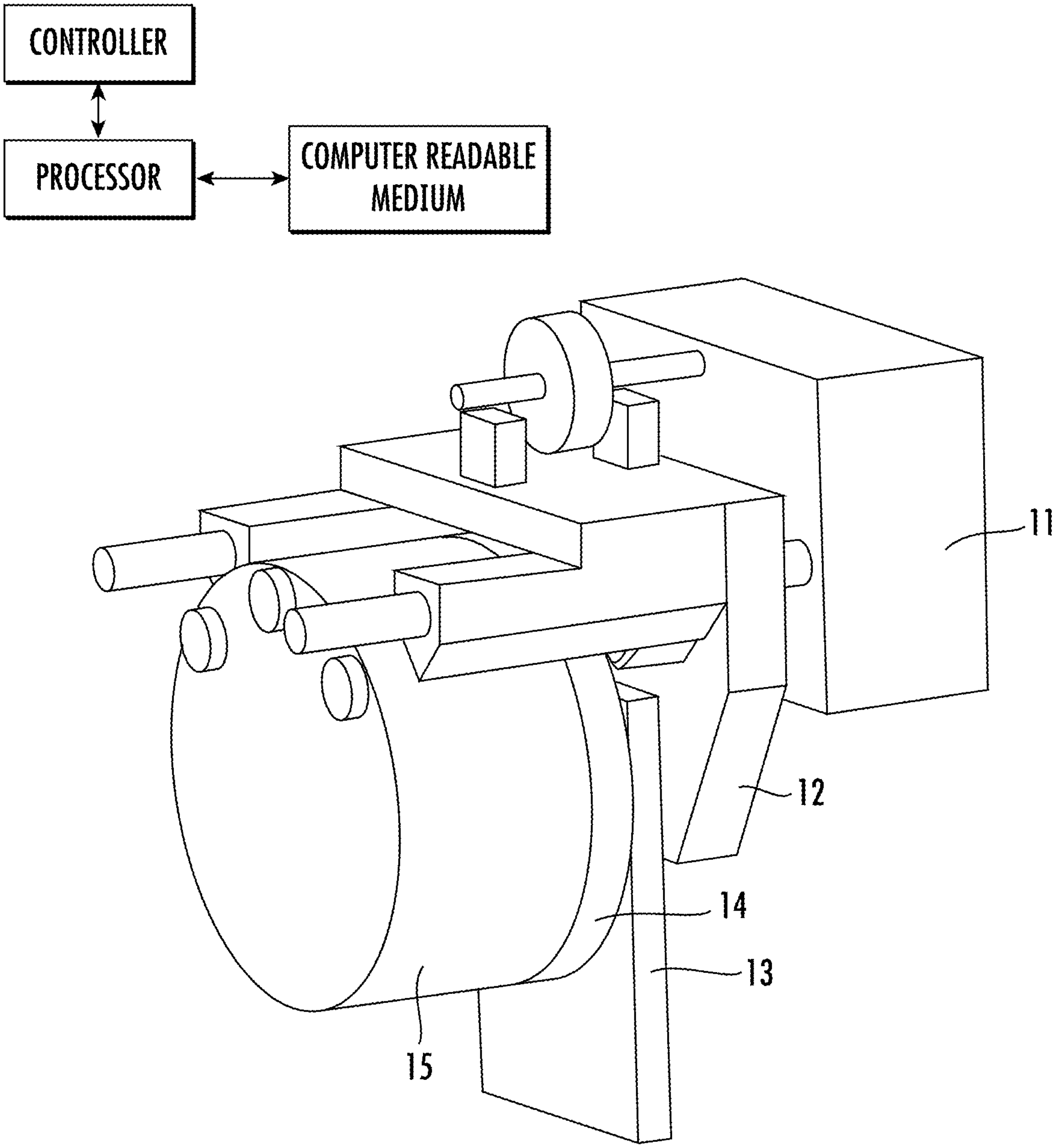
FIG. 1 shows a perspective view of an exemplary brake device.
Figure 2:
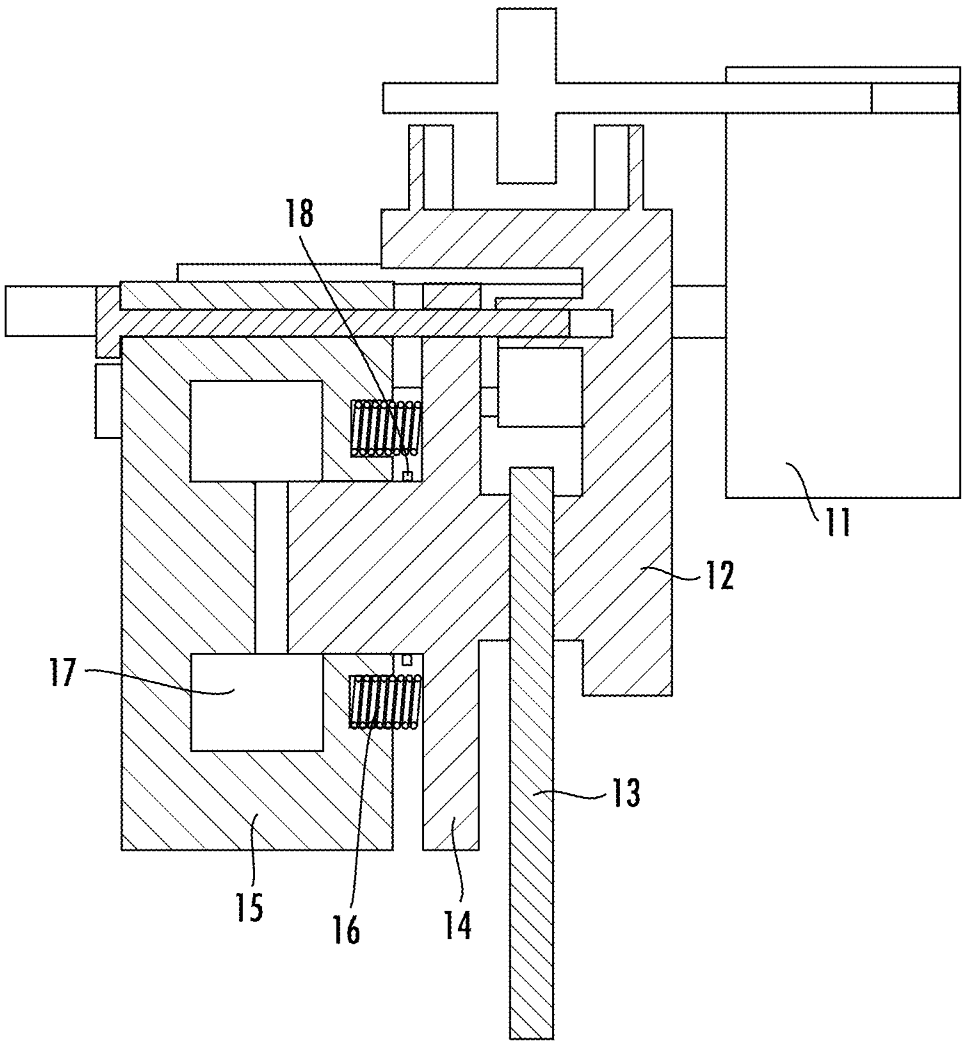
FIGS. 2 and 3 respectively show cross-sectional views of the exemplary brake device in FIG. 1 when it is in a braking state and when it is in a non-braking state.
Figure 3:
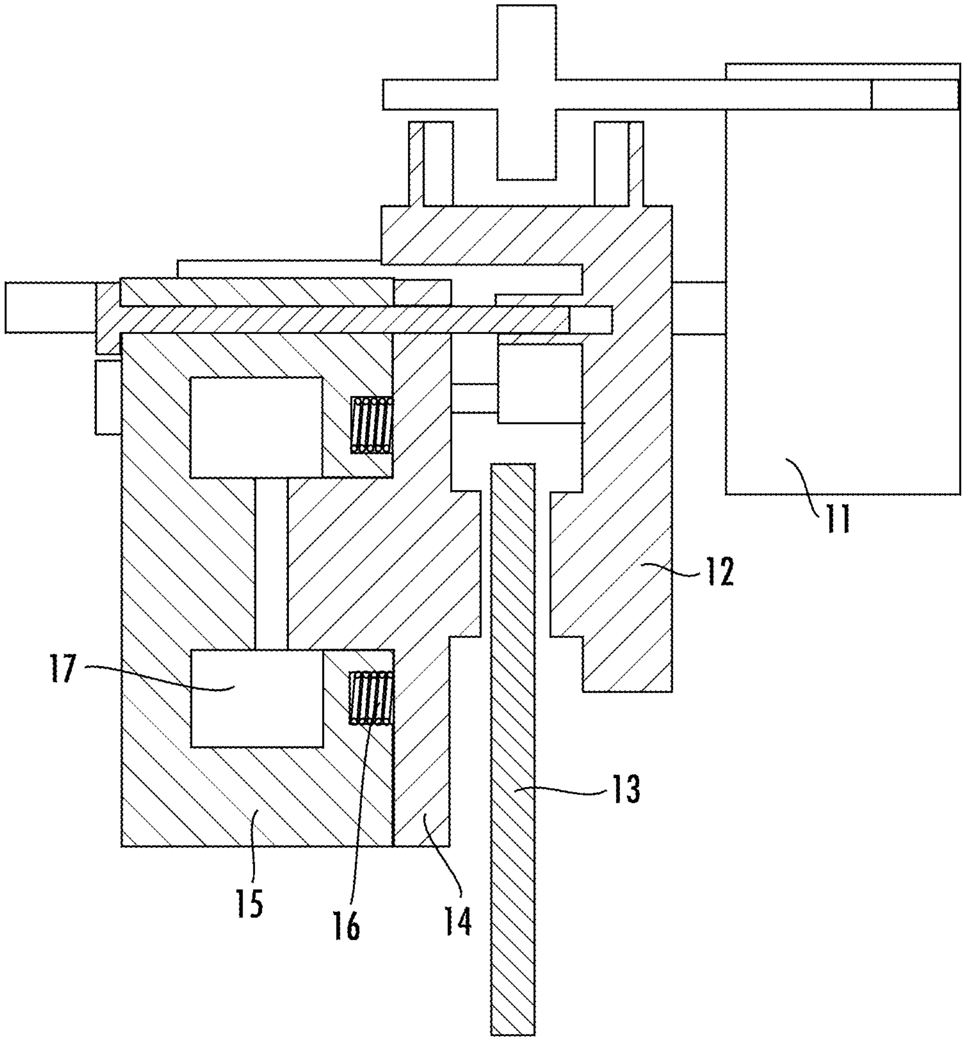

With reference to FIGS. 1 to 3, a perspective view of an exemplary brake system for an elevator system and cross-sectional views thereof in a braking state and a non-braking state are shown respectively. The brake device includes a bracket 11, a frame 12 fixed to the bracket 11, a brake disc 13 coupled to a drive shaft of the elevator system, a movable plate 14 and a stationary plate 15. The movable plate 14 and the frame 12 are located on both sides of the brake disc 13, and friction plates are provided on the side thereof that faces the brake disc 13. As shown in FIG. 2, a spring 16 is located between the movable plate 14 and the stationary plate 15, and the spring 16 is compressed to tend to push the brake pads on the movable plate 14 and the frame 12 to contact the brake disc 13 on the drive shaft and cause friction with the brake disc 13 so as to restrain the rotation of the drive shaft. The stationary plate 15 is also provided with an electromagnetic coil 17, which can generate a magnetic field when energized, thereby attracting the movable plate 14 to move closer to the stationary plate 15 and away from the brake disc 13. Consequently, the brake disc 13 is released, so that the drive shaft connected to the brake disc 13 can rotate freely and drive an elevator car to ascend or descend. A brake switch 18 may be located between the stationary plate 15 and the movable plate 14. When the movable plate 14 is attracted to approach the stationary plate 15 or driven by the spring 16 to move away from the stationary plate 15, it will contact the brake switch 18 and switch the state of the brake switch 18. Therefore, the position of the movable plate 14, that is, the state of the brake device, can be determined through the signal of the brake switch 18. The brake switch 18 is generally fixed to the stationary plate 15 through a bracket. During the initial installation, the work staff will set the position of the brake switch 18 so that it can accurately detect whether the movable plate is in the braking position shown in FIG. 2 or the non-braking position shown in FIG. 3. However, the position of the brake switch 18 will deviate during use, and when the deviation reaches a certain extent, it is possible that the position state of the movable plate 14 cannot be recognized or may be incorrectly recognized, thereby the safety system of the elevator system fails to know the state of the movable plate and stops the operation of the elevator system for safety consideration. At this point, the user will report the failure, and the technicians need to rush to the site for repairing for example adjusting the position of the brake switch 18. The emergency repairs caused by the position of the brake switch 18 may account for a large proportion of the total repairs. Therefore, it is desirable to provide a device and a method that can detect the deviation of the brake switch 18 and notify maintenance personnel when the brake switch 18 deviates so as to adjust it to a proper position during routine maintenance.

Figure 4:
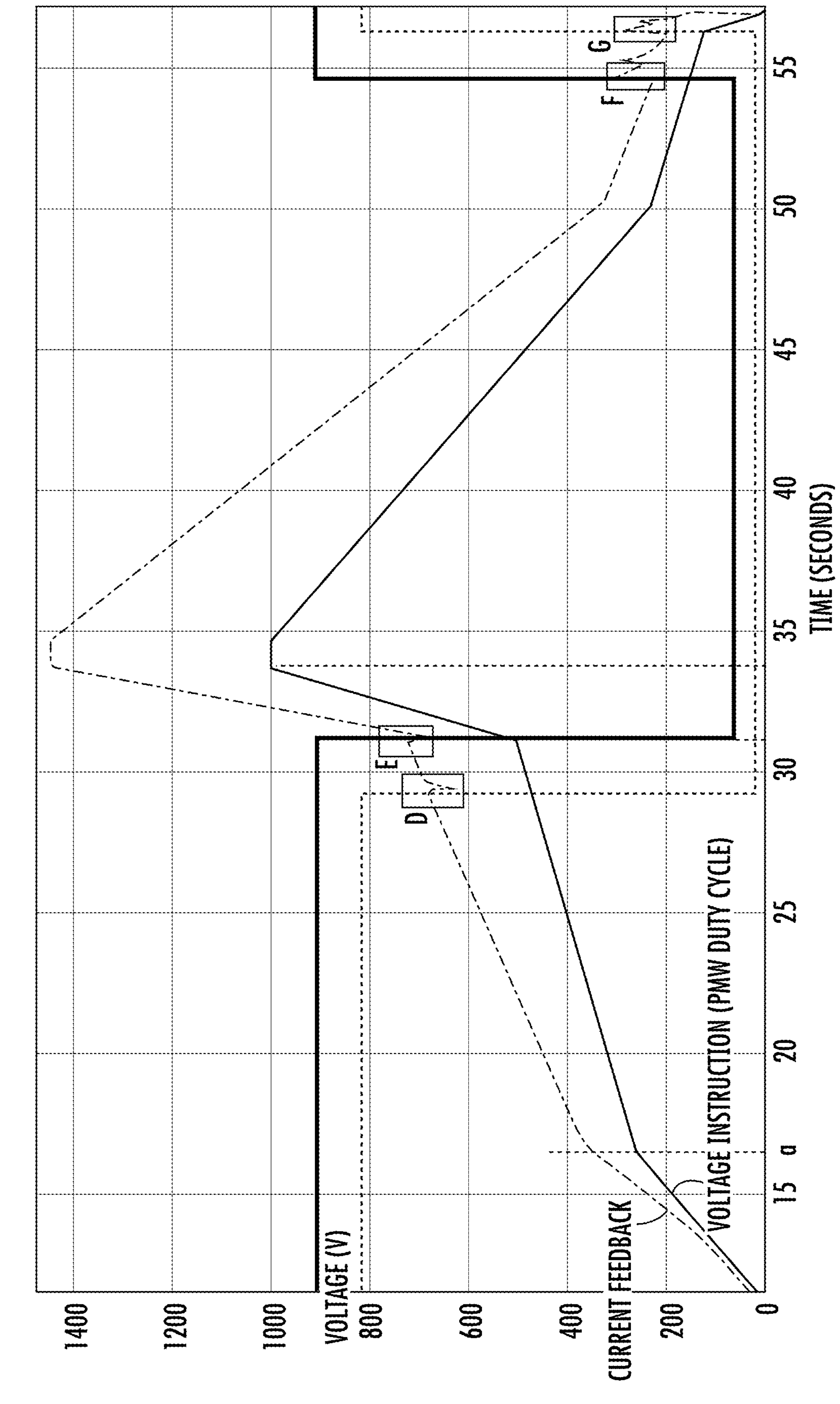
FIG. 4 is a curve showing the change of current over time in a method according to an embodiment of the present disclosure.
Figure 5:
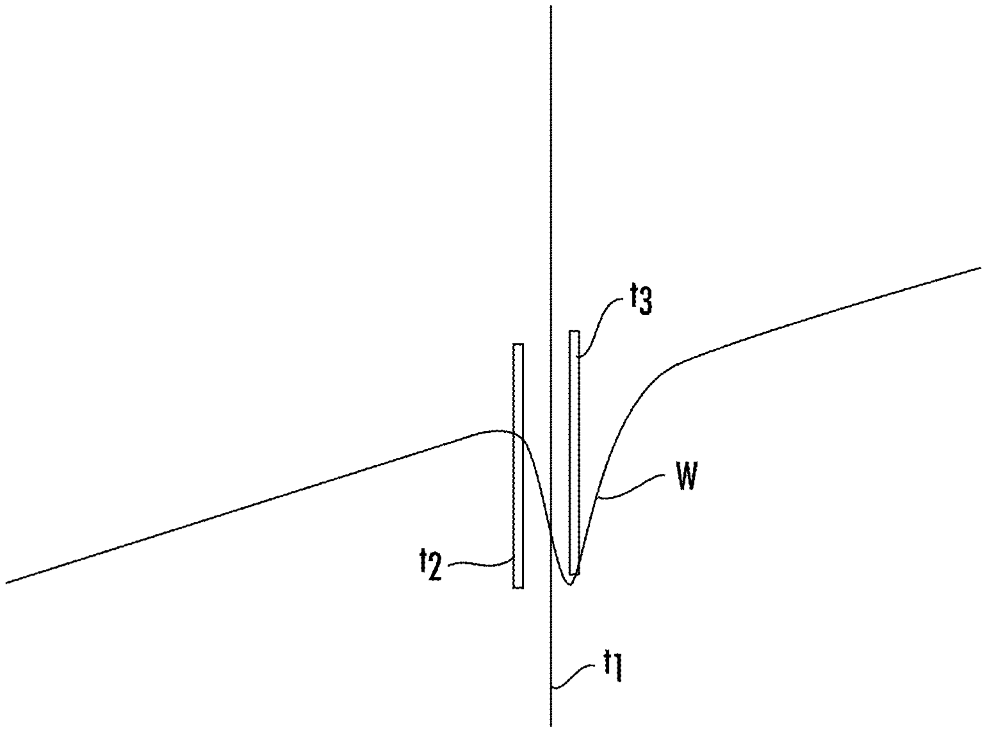
FIG. 5 is a partial enlarged view of area D of the curve of FIG. 4.

According to an aspect, a self-checking device and a self-checking method for an elevator brake device are provided. The method includes: enabling an elevator to enter a test mode; gradually increasing a voltage applied to the electromagnetic coil 17 of the brake device in a predetermined pattern when the brake device is in the braking state shown in FIG. 2, or gradually decreasing the voltage applied to the electromagnetic coil 17 of the brake device in a predetermined pattern when the brake device is in the non-braking state shown in FIG. 3; recording a first time $t_1$ when the brake switch 18 of the brake device is triggered; and determining whether the brake switch 18 is in a proper position based on the first time $t_1$. The so-called "proper position" may refer to a position range in which the brake switch 18 can operate normally within an allowable deviation amount near a pre-installation position. The self-checking method can be executed based on time, for example, at a regular time interval, such as once every other week, every other ten days or every other month, or before routine maintenance, etc. The self-checking method can be executed when the elevator system is not braked, for example, at night. Generally speaking, the self-checking method starts to be executed when the brake device is in a braking state and the elevator is stopped. First, the elevator enters the test mode, for example, under the control of a control device. The control device can determine whether it is suitable for the elevator to enter the test mode based on factors such as time, current load of elevators, current number of elevators, etc. After entering the test mode, the control device will no longer accept other instructions such as elevator-calling instructions before the elevator completes the self-checking. Subsequently, the control device can control a voltage applying device such as that of the brake device to gradually increase the voltage applied to the electromagnetic coil 17 of the brake device in a predetermined pattern. At the same time, the control system of the elevator will provide torque to keep the car position unchanged. The "predetermined pattern" means that the voltage is applied to the electromagnetic coil 17 in a gradually increasing predetermined voltage waveform or voltage curve. For example, as shown in FIG. 4, the voltage increases linearly in three sections with different slopes, including a first section 0 to a, a second section a to b, and a third section b to c. The voltage increasing rates of various sections (that is, the slopes of the curves of various sections) are different. In an alternative embodiment, the voltage increasing mode or pattern may be different from the illustrated embodiment; for example, there are only two linear sections or only one linear section. Subsequently, for example, a processor may record the first time $t_1$ when the brake switch 18 of the brake device is triggered, and determine whether the brake switch 18 is in the proper position based on the first time $t_1$.

The first time $t_1$ when the brake switch 18 is triggered is associated with the position where the brake switch 18 is located. When the position of the brake switch 18 starts to deviate, the first time $t_1$ will also change. Therefore, it can be determined whether the brake switch 18 is in the proper position based on the difference or deviation of the first time $t_1$. For example, in some embodiments, the method may include: determining a reference trigger time $t_0$ of the brake switch based on a correct installation position of the brake switch 18 during commissioning; and determining whether the brake switch 18 is in the proper position based on the difference between the first time $t_1$ and the reference trigger time $t_0$. For example, the reference trigger time $t_0$ can be measured during the installation and commissioning of the elevator system, and the difference between the first time $t_1$ and the reference trigger time $t_0$ can be determined in the actual test. When the difference between the two reaches a certain degree, it is considered that the position of the brake switch 18 needs to be adjusted; otherwise, the normal operation of the elevator may be affected.

In some embodiments, the method further includes: monitoring the current of the electromagnetic coil. As shown in FIG. 4, there is a correspondence between the current curve and the voltage curve. Further, the fluctuation of the current of the electromagnetic coil is recorded, and a second time $t_2$ at the beginning of the fluctuation of the current and a third time $t_3$ at the trough of the fluctuation of the current are recorded; and it is determined whether the brake switch 18 is in the proper position based on a relative relationship among the first time $t_1$, the second time $t_2$ and the third time $t_3$. It should be understood that the fluctuation w in the current curve can be explained by the Lenz's law, and the second time $t_2$ at the beginning of the fluctuation for example corresponds to the time when an electromagnetic force generated by the electromagnetic coil 17 just exceeds the spring force exerted by the spring 16 and the movable plate 14 just begins to separate from the brake disc 13; and the third time $t_3$ at the trough of the fluctuation of the current corresponds to the time when the movable plate 14 just begins to engage with the stationary plate 15. It should be understood that the first time $t_1$ when the brake switch 18 is triggered should be between the second time $t_2$ and the third time $t_3$, since the movable plate 14 first triggers the brake switch 18 after separating from the brake disc 13 and then contacts the stationary plate 15. Therefore, it can be determined whether the brake switch 18 is in the proper position based on a relative relationship among the first time $t_1$, the second time $t_2$ and the third time $t_3$. For example, in some embodiments, a function related to the first time $t_1$, the second time $t_2$ and the third time $t_3$ can be set, and when the first time $t_1$, the second time $t_2$ and the third time $t_3$ actually detected satisfy the function, it is considered that the brake switch 18 is properly positioned; otherwise, it is considered that the position of the brake switch 18 has deviated and needs to be adjusted. The specific function can be set in consideration of factors such as the actual installation condition and the tolerance to the switch position deviation. For example, in a non-limiting example, it may be determined that the brake switch 18 is in the proper position when $(t_1-t_2)$ is in a range of $a_1(t_3-t_2)$ to $a_2(t_3-t_2)$, and when $(t_1-t_2)$ is outside the range of $a_1(t_3-t_2)$ to $a_2(t_3-t_2)$, it is determined that the brake switch is in an improper position, wherein $a_1$ is for example selected from 0.2-0.5 and $a_2$ is selected from 0.5-0.8. That is, when $t_1$ is in the middle area between $t_2$ and $t_3$ or in an area closer to $t_2$, it is considered that the brake switch 18 is properly positioned; otherwise, it is considered that the position of the brake switch 18 has deviated and needs to be adjusted. In other embodiments, a relationship among the magnitudes of the currents on the current curve at the first time $t_1$, the second time $t_2$ and the third time $t_3$ can also be used as the basis for the judgment. More specifically, it can be determined whether the brake switch is in the proper position based on a relative relationship among a current $I_1$ at the first time $t_1$, a current $I_2$ at the second time $t_2$ and a current $I_3$ at the third time $t_3$. For example, in some embodiments, a function related to the current $I_1$ at the first time $t_1$, the current $I_2$ at the second time $t_2$ and the current $I_3$ at the third time $t_3$ can be set, and when the current $I_1$ at the first time $t_1$, the current $I_2$ at the second time $t_2$ and the current $I_3$ at the third time $t_3$ that are actually detected satisfy the function, it is considered that the brake switch 18 is properly positioned; otherwise, it is considered that the position of the brake switch 18 has deviated and needs to be adjusted. In some embodiments, a judgment reference function can be determined based on a relationship among a reference trigger time $t_0$, a reference second time $t_2'$ and a reference third time $t_3'$ in a reference test, and it is determined whether the first time $t_1$, the second time $t_2$ and the third time $t_3$ in the actual test satisfy the judgment reference function, thereby determining whether the position of the brake switch 18 needs to be adjusted; similarly, the reference function can also be set according to reference currents $I_1$, $I_2$ and $I_3$ during the test.

In some embodiments, the applied voltage increases at a first rate in the first section 0-*a* before the fluctuation position, increases at a second rate in the second section a-b including the fluctuation position, and increases at a third rate in the third section after the fluctuation position, wherein the second rate is lower than the first rate and the third rate. It should be understood that increasing the voltage at a reduced rate in the second section where the fluctuation will occur can amplify the fluctuation, thus making it easier and more accurate to detect the relationship among the first time $t_1$, the second time $t_2$ and the third time $t_3$. In addition, in the first section and the third section, the voltage should be increased at a rate as large as possible, thereby shortening the entire test cycle, and avoiding long-term testing that affects the normal operation of the elevator. It should be understood that during the entire test, in addition to the fluctuation caused by the movement of the movable plate, the current may be disturbed by other factors. At this point, since the signal indicating that the brake switch 18 is triggered is not received in the fluctuation time interval, the processor will ignore this current fluctuation. It should be understood that there are two fluctuations D and E in the ascending section of the curve shown in FIG. 4, which respectively correspond to the movements of the movable plates driven by the two coils, whereas the two trough parts can be used as independent curves for determining the position of the brake switch of each movable plate. If the mode in which only one brake is released in each test is used, that is, the other brake is always in the braking state during the test, only one trough corresponding to the switch signal will be seen. In addition, although not seen in the curve shown, there may also be disturbing troughs in the curve, which are generated by other factors such as the inclination of the movable plate of the brake or uneven air gap. These disturbing troughs can be excluded by determining whether there are corresponding switch signals. In addition, the curve of FIG. 4 also shows fluctuations F and G in the descending section, which can be used in a similar manner to determine the installation position of the brake switch.

In some embodiments, the voltage may be applied gradually increasing from 0% to 100% or gradually decreasing from 100% to 0% in a way of pulse width modulated duty cycle. In some embodiments, a notification can be sent to maintenance personnel when the brake switch is not properly installed. For example, the maintenance personnel can adjust the brake switch to the proper position in the next daily maintenance, thereby preventing the elevator system from stopping operating due to the deviation of the position of the brake switch.

The device and method according to the present disclosure can provide an early warning for the position deviation of the brake switch to remind the work staff to adjust the brake switch to the proper position during routine maintenance, thereby avoiding malfunctions caused by the deviation of the position of the brake switch.

The specific embodiments described above are merely for describing the principle of the present disclosure more clearly, and various components are clearly illustrated or depicted to make it easier to understand the principle of the present disclosure. Those skilled in the art can readily make various modifications or changes to the present disclosure without departing from the scope of the present disclosure. Therefore, it should be understood that these modifications or changes should be included within the scope of protection of the present disclosure.

What is claimed is:

1. A device for an elevator brake device, comprising:

a controller, which controls a voltage applied to an electromagnetic coil of the elevator brake device, and which is configured to: enable an elevator to enter a test mode; gradually increase the voltage applied to the electromagnetic coil of the brake device in a predetermined pattern when the brake device is in a braking state, or gradually decrease the voltage applied to the electromagnetic coil of the brake device in a predetermined pattern when the brake device is in a non-braking state; and a processor, which is configured to receive and record a first time $t_1$ when a brake switch of the brake device is triggered, and determine whether the brake switch is in a proper position based on the first time $t_1$;

wherein the processor is further configured to: monitor a current of the electromagnetic coil; record the fluctuation of the current of the electromagnetic coil, and record a second time $t_2$ at the beginning of the fluctuation of the current and a third time $t_3$ at the trough of the fluctuation of the current; and determine whether the brake switch is in the proper position based on a relative relationship among the first time $t_1$, the second time $t_2$ and the third time $t_3$, or determine whether the brake switch is in the proper position based on a relative relationship among a current $I_1$ at the first time $t_1$, a current $I_2$ at the second time $t_2$ and a current $I_3$ at the third time $t_3$.

2. The device according to claim 1, wherein the processor is configured to determine that the brake switch is in the proper position when $(t_1-t_2)$ is in a range of $a_1(t_3-t_2)$ to $a_2(t_3-t_2)$, and that the brake switch is in an improper position when $(t_1-t_2)$ is outside the range of $a_1(t_3-t_2)$ to $a_2(t_3-t_2)$, and wherein $a_1$ is selected from 0.2-0.5 and $a_2$ is selected from 0.5-0.8.

3. The device according to claim 1, wherein the processor is further configured to: determine a reference trigger time $t_0$ of the brake switch based on a correct installation position of the brake switch during commissioning; and determine whether the brake switch is in the proper position based on the difference between the first time $t_1$ and the reference trigger time $t_0$.

4. The device according to claim 1, wherein the controller is configured to increase or decrease the voltage at a first rate in a first section before the fluctuation position, to increase or decrease the voltage at a second rate in a second section including the fluctuation position, and to increase or decrease the voltage at a third rate in a third section after the fluctuation position, and wherein the second rate is lower than the first rate and the third rate.

5. The device according to claim 1, wherein the controller is configured to apply the voltage gradually increasing from 0% to 100% or gradually decreasing from 100% to 0% in a way of pulse width modulated duty cycle.

6. The device according to claim 1, wherein the controller is configured to repeat the self-checking at a specific time interval.

7. The device according to claim 1, wherein the processor is configured to send a notification when the brake switch is not properly installed.

8. An elevator system, comprising the device according to claim 1.

9. A method for an elevator brake device, comprising:

enabling an elevator to enter a test mode;

gradually increasing a voltage applied to an electromagnetic coil of the brake device in a predetermined pattern when the brake device is in a braking state, or gradually decreasing the voltage applied to the electromagnetic coil of the brake device in a predetermined pattern when the brake device is in a non-braking state;

recording a first time $t_1$ when a brake switch of the brake device is triggered; and determining whether the brake switch is in a proper position based on the first time $t_1$;

the method further comprising:

monitoring a current of the electromagnetic coil;

recording the fluctuation of the current of the electromagnetic coil, and recording a second time $t_2$ at the beginning of the fluctuation of the current and a third time $t_3$ at the trough of the fluctuation of the current; and determining whether the brake switch is in the proper position based on a relative relationship among the first time $t_1$, the second time $t_2$ and the third time $t_3$, or determining whether the brake switch is in the proper position based on a relative relationship among a current $I_1$ at the first time $t_1$, a current $I_2$ at the second time $t_2$ and a current $I_3$ at the third time $t_3$.

10. The method according to claim 9, wherein it is determined that the brake switch is in the proper position when $(t_1-t_2)$ is in a range of $a_1(t_3-t_2)$ to $a_2(t_3-t_2)$, and that the brake switch is in an improper position when $(t_1-t_2)$ is outside the range of $a_1(t_3-t_2)$ to $a_2(t_3-t_2)$, and wherein $a_1$ is selected from 0.2-0.5 and $a_2$ is selected from 0.5-0.8.

11. The method according to claim 9, further comprising:

determining a reference trigger time $t_0$ of the brake switch based on a correct installation position of the brake switch during commissioning; and determining whether the brake switch is in the proper position based on the difference between the first time $t_1$ and the reference trigger time $t_0$.

12. The method according to claim 9, wherein the voltage increases or decreases at a first rate in a first section before the fluctuation position, increases or decreases at a second rate in a second section including the fluctuation position, and increases or decreases at a third rate in a third section after the fluctuation position, and wherein the second rate is lower than the first rate and the third rate.

13. The method according to claim 9, wherein the voltage is applied gradually increasing from 0% to 100% or gradually decreasing from 100% to 0% in a way of pulse width modulated duty cycle.

14. The method according to claim 9, further comprising repeating the self-checking method at a specific time interval.

15. The method according to claim 9, further comprising sending a notification when the brake switch is not properly installed.

16. A non-transitory computer-readable medium, in which a computer program is stored, wherein when the computer program is executed, it performs the method according to claim 9.

* * * * *